May 11, 1943.　　A. A. ABRAMSON ET AL　　2,319,099
CONTAINER MAKING MACHINE
Filed Nov. 25, 1940　　5 Sheets-Sheet 1
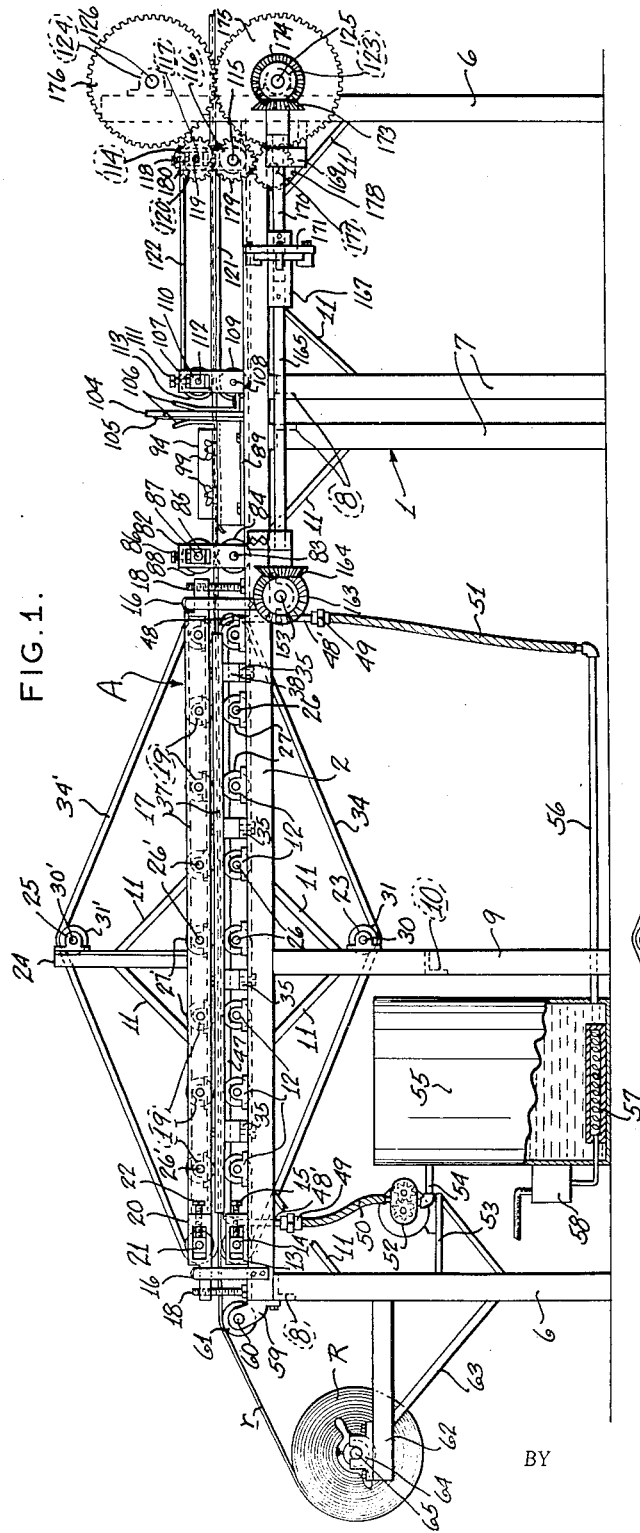
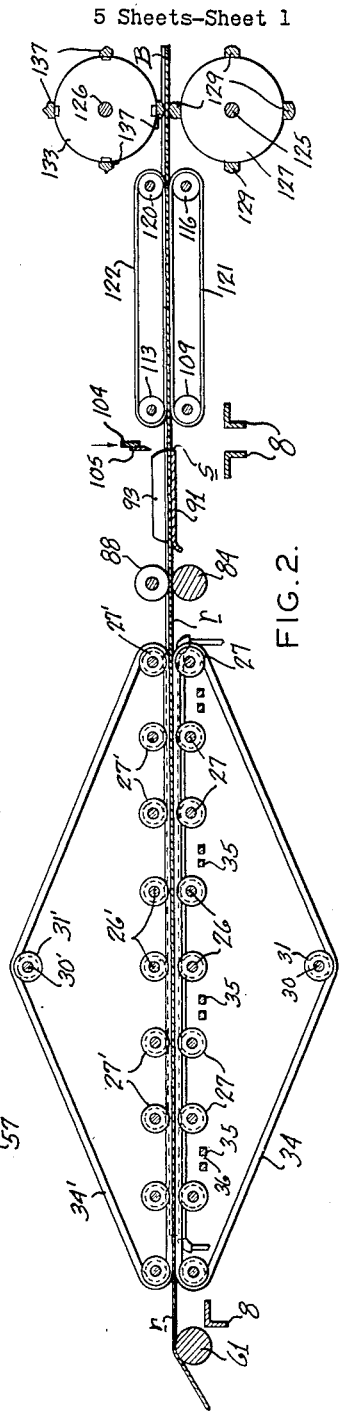
INVENTOR.
ALVIN A. ABRAMSON
CARLETON MANTHEY
BY Ralph Rausch
ATTORNEY.

May 11, 1943.  A. A. ABRAMSON ET AL  2,319,099
CONTAINER MAKING MACHINE
Filed Nov. 25, 1940  5 Sheets-Sheet 2

INVENTOR.
ALVIN A. ABRAMSON
CARLETON MANTHEY
BY Ralph Kalish
ATTORNEY.

May 11, 1943.　　　A. A. ABRAMSON ET AL　　　2,319,099
CONTAINER MAKING MACHINE
Filed Nov. 25, 1940　　　5 Sheets-Sheet 3

INVENTOR.
ALVIN A. ABRAMSON
CARLETON MANTHEY
BY
ATTORNEY.

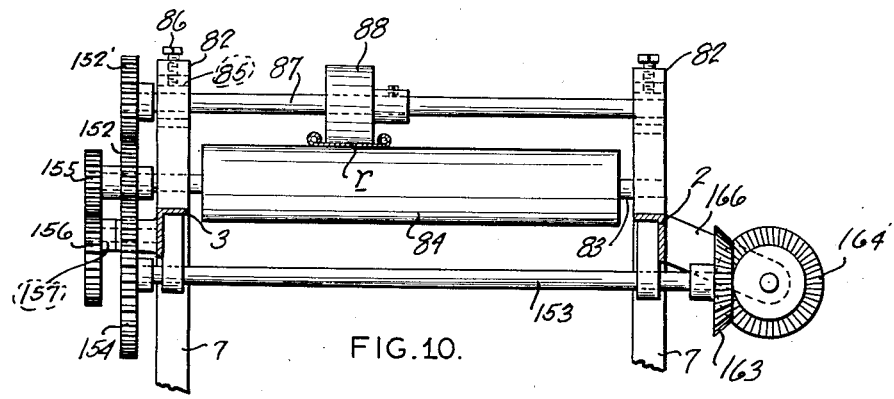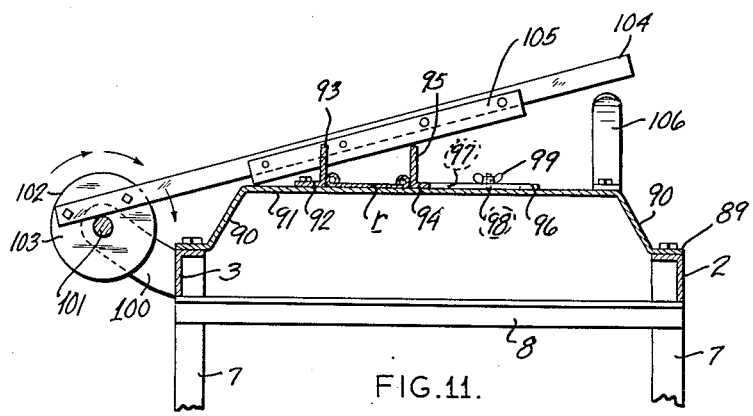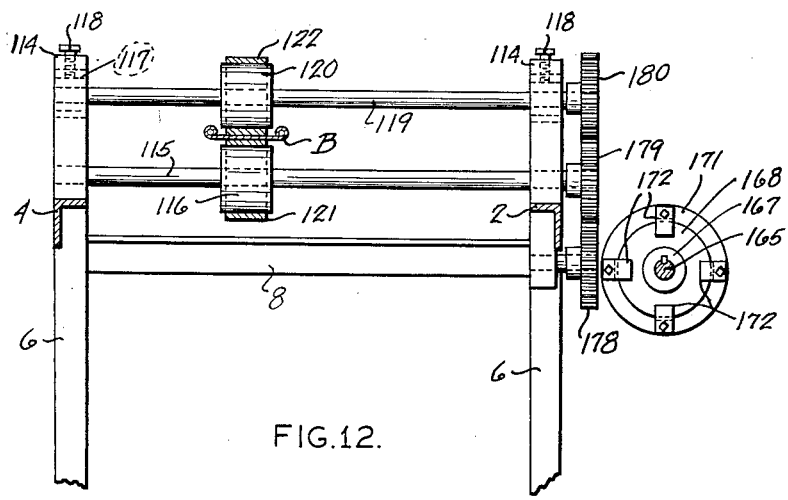

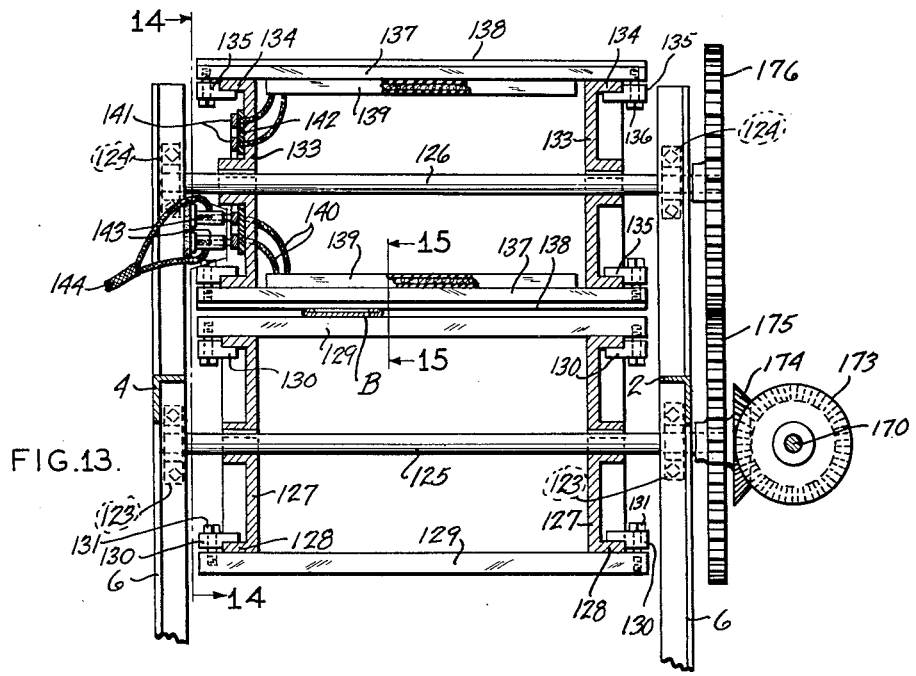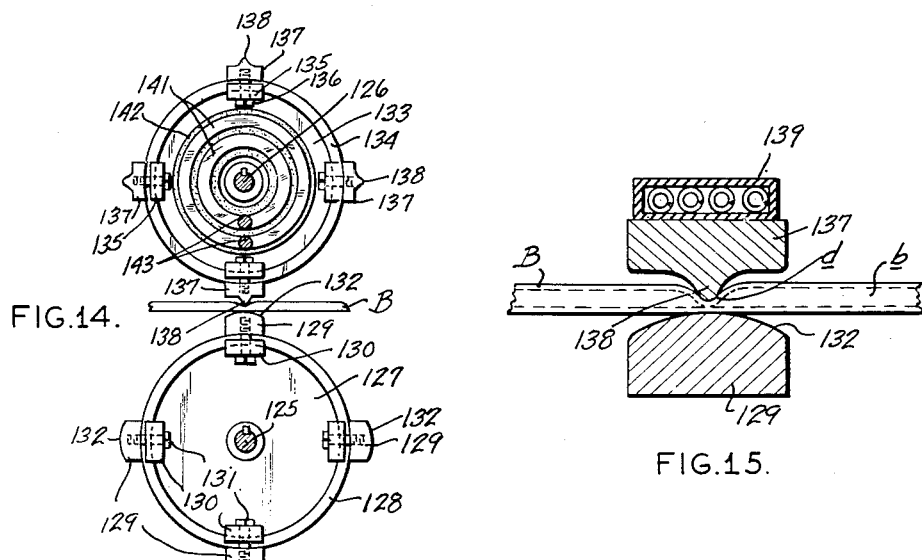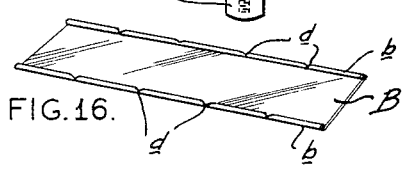

Patented May 11, 1943

2,319,099

UNITED STATES PATENT OFFICE 2,319,099

CONTAINER-MAKING MACHINE

Alvin A. Abramson and Carleton Manthey, St. Louis, Mo., assignors to Central States Paper & Bag Company, St. Louis, Mo., a corporation of Missouri Application November 25, 1940, Serial No. 367,004

9 Claims. (Cl. 18—19)

This invention relates generally to certain new and useful improvements in container-making machines and, more particularly, to mechanism for forming box-wall members from synthetic plastic material.

Our invention has for its primary objects the provision of container-making machinery of the type stated which is entirely automatic and extremely flexible in operation, being capable of forming container side walls and similar elements of various different types and sizes in a continuous manner and at unusually high speed from synthetic plastic materials, such, for example, as cellulose acetate, without wrinkling, tearing, or otherwise impairing the transparency of the material.

Our invention also has for further objects the provision of side wall making machinery which is rugged, durable, and economical in construction, which may be simply, quickly, and conveniently adjusted to accommodate materials of different sizes, and which is highly efficient in the performance of its stated functions.

Our invention also has for an additional object the provision of a transparent container side wall forming strip which is structurally strong and rigid though made of relatively flexible sheet material initially without rigidity.

And with the above and other objects in view, our invention resides in the novel features of form, construction, arrangement, and combination of parts presently described and pointed out in the claims.

In the accompanying drawings (five sheets)—

Figure 1 is a side elevational view of a container-making machine constructed in accordance with and embodying our present invention;

Figure 2 is a fragmentary longitudinal sectional view of the machine;

Figure 3 is a top plan view of the machine;

Figure 4 is a fragmentary side elevational view of the main driving mechanism of the machine;

Figure 5 is a fragmentary side elevational view of the stock-roll braking mechanism of the machine;

Figure 7:
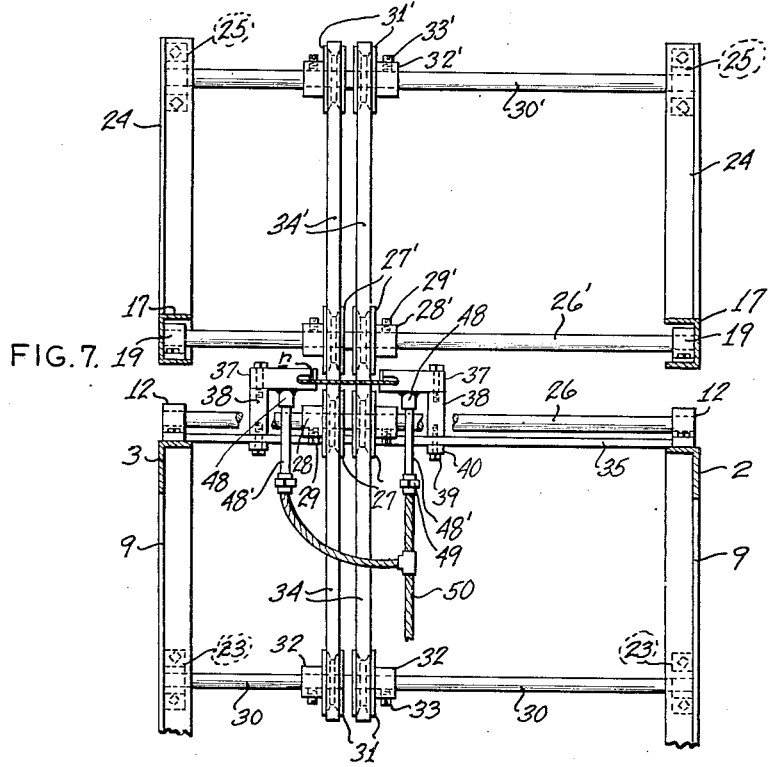

Figures 6, 7, 8, 9, 10, 11, 12, and 13 are fragmentary sectional views of the machine taken, respectively, along the lines 6—6, 7—7, 8—8, 9—9, 10—10, 11—11, 12—12, and 13—13, Figure 3;

Figures 14 and 15 are fragmentary sectional views of the machine taken approximately along the lines 14—14 and 15—15, Figure 13; and Figure 16 is a perspective view of a finished side wall container-member formed by the machine of our present invention.

Referring now in more detail and by reference characters to the drawings, which illustrate a preferred embodiment of our invention, the container-making machine of our invention, generally designated A, includes a frame 1 formed of suitably connected angle iron members comprising a longitudinal rail 2 extending the full length of the machine and opposed parallel rails 3, 4, longitudinally aligned and endwise spaced in the provision of a gap 5, the combined lengths of the rails 3, 4, and gap 5 being equivalent to the total length of the rail 2. The rails 2, 3, 4, are furthermore provided with vertical pairs of end legs 6 and intermediate legs 7, the latter being disposed adjacent the gap 5. The legs 6, 7, and associated rails 2, 3, 4, are transversely connected in frame formation by suitable cross members 8. Intermediate the ends of the rail 3, the frame 1 is provided with an auxiliary pair of legs 9 transversely connected by a cross member or brace 10, the legs 6, 7, 9, all being preferably, though not necessarily, strengthened by conventional diagonal bracing bars 11, all as best seen in Figure 1 and for purposes presently fully appearing.

Fixed upon the upper faces of the rails 2, 3, between the gap 5 and the rearward or intake end of the machine A, is a plurality of uniformly spaced pairs of transversely aligned pillow blocks 12, and similarly mounted upon the rails 2, 3, between the rearward end of the machine A and the first pair of pillow blocks 12, is a pair of transversely aligned slide blocks 13 provided with horizontally shiftable journal members 14 adjustably held in place by means of screws 15. Mounted upon the outwardly presented sides of the rails 2, 3, adjacent the first and last pairs of pillow blocks 12, are upwardly projecting pairs of opposed parallel legs 16, and slidably mounted at their ends in and extending between the legs 16 in upwardly spaced parallel registration with the rails 2, 3, respectively, are auxiliary rails 17 held in vertically adjusted position by means of screws 18 and provided with a plurality of uniformly spaced pairs of transversely registering pillow blocks 19, the several pairs of pillow blocks 19 being arranged in superposed or vertical alignment with the several pairs of pillow blocks 12. Also mounted on the auxiliary rails 17 in superposed vertical alignment with the slide blocks 13, is a pair of transversely registering slide blocks 20 provided with horizontally shiftable journals 21 held in adjusted position by screws 22.

Mounted on the auxiliary legs 9 below the rails 2, 3, is a pair of transversely registering pillow blocks 23, and similarly mounted upon upwardly projecting arms 24 secured at their lower ends respectively to the auxiliary rails 17 in longitudinal alignment with the legs 9, is a pair of transversely registering pillow blocks 25. Journaled in and extending horizontally between each of the pairs of pillow blocks 12, 19, are shafts 26, 26', each respectively provided with pairs of shiftable guide pulleys or sheaves 27, 27', having hubs 28, 28', and adjustably secured in place by means of set screws 29, 29', threaded respectively through the hubs 28, 28', for retentive engagement with the shafts 26, 26'. Similarly journaled at their ends in the pillow blocks 23 and 25, respectively, are upper and lower idler shafts 30, 30', likewise provided with shiftable idler pulleys or sheaves 31, 31', having hubs 32, 32', and held in place by means of set screws 33, 33'. In any position of adjustment, the several pairs of pulleys 27, 27', 31, 31', are preferably set or positioned in respective peripheral registration or alignment, and trained around the aligned pairs of pulleys 27, 31, is a pair of belts 34 and around the pulleys 27', 31', is an identical pair of belts 34', the belts 34, 34', being of such thickness as to project beyond the peripheral margins of their respective pulleys, all as best seen in Figure 7 and for purposes presently more fully appearing.

Figure 8:
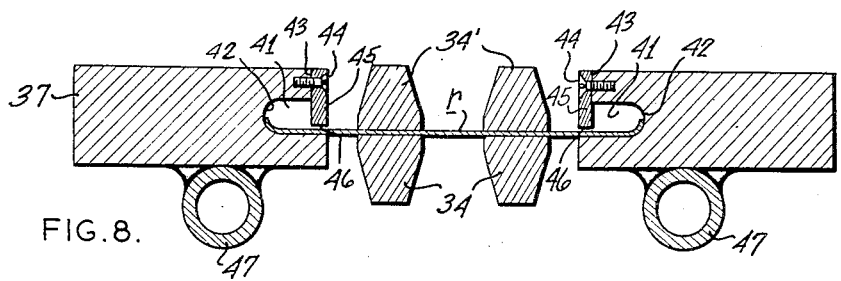
Figure 9:
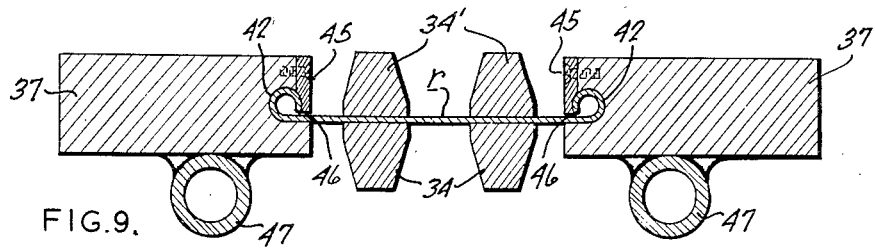

Secured at their ends upon and extending horizontally between the rails 2, 3, is a plurality of spaced cross bars 35 provided intermediate their ends with longitudinal slots 36. Disposed approximately midway between the shafts 26, 26', is a pair of laterally spaced, horizontal bead-forming bars 37 provided upon their under faces with downwardly extending leg members 38, which are, in turn, shiftably secured upon the bars 35 by means of clamping bolts 39 extending through the slots 36 for threaded engagement with the legs 38 and provided at their headed ends with suitable washers 40 for engagement with the under side of the slotted cross bars 35. In their opposed lateral faces, the bars 37 are milled out in the provision of longitudinal channels or grooves 41 having an arcuate inner wall or face 42. Above the grooves 41, the bars 37 are cut away, as at 43, and secured by means of screws 44 upon such cut away portions 43, are longitudinally extending strips 45 of sufficient thickness to be flush upon their outwardly presented faces with the bar face-portion below the grooves 41 and of sufficient width to project downwardly substantially across the grooves 41, thereby restricting the opening into the groove to a relatively narrow slot 46. It should be noted in this connection that, from the so-called rearward or intake end to the forward or discharge end, the grooves 41 gradually decrease in depth and the back wall 41 becomes increasingly more circular, all as best seen in Figures 8 and 9 and for purposes presently more fully appearing.

Welded or otherwise suitably secured upon the under faces of the bars 37 and extending longitudinally therealong preferably in close proximity to the grooves 41, are tubular conduits 47 provided at their ends with downwardly extending elbows 48 and nipples 48', which are, in turn, connected by means of conventional unions or other suitable couplings 49 to flexible tubes 50, 51. At its lower end, the tube 50 is suitably connected to the discharge port of a conventional motor-driven gear pump 52 mounted upon a supporting bracket 53 hung from the end leg 6 and connected at its intake side by means of the nipple 54 to the upper portion of an enclosed oil tank 55. The flexible tube 51 is similarly connected by means of a pipe 56 to the lower portion of the oil tank 55. Suitably mounted within the oil tank 55, is an electric heater 57 conventionally connected through a thermostat 58 to a suitable source of electric current (not shown).

Bolted or otherwise suitably secured upon the outwardly presented faces of the rear legs 6, is a pair of projecting journal brackets 59, and journaled at its ends therein, is a horizontal shaft 60 provided intermediate the journal brackets 59 with a diametrally enlarged guide roller 61. Also fixed upon and extending rearwardly from either of the rear legs 6, are transversely aligned horizontal bracket arms 62 conventionally reinforced by diagonal braces 63 and provided at their outer ends with aligned upwardly opening yoke bearings 64 for removably and rotatably supporting a horizontal shaft 65. At one of its ends, the shaft 65 projects beyond the yoke bearing 64 and is provided with a fixed diametrally enlarged wheel or drum 66. Swingably mounted upon the adjacent bracket arm 62 in eccentric relation to the shaft 65 by means of a stud 67, is a brake arm 68 having a central somewhat semi-circular band section 69 for engagement with the peripheral face of the wheel or drum 66. Swingably mounted upon the arm 68 by means of a link 70, is a companion-shaped brake arm 71 likewise provided with a central brake band section 72 for engagement with the peripheral face of the wheel or drum 66 in opposed relation to the brake band section 69 and rotatably provided at its outer or free end with a wing bolt 73 adapted for threaded engagement in the opposed outer or free end of the brake arm 68 for increasing or decreasing the frictional force with which the wheel or drum 66 is engaged, all as best seen in Figure 5.

Intermediate the yoke bearings 64, the shaft 65 is shiftably provided with a pair of opposed frusto-conical stock-roll bearing sleeves 74, 75, the sleeve 74 being adjustably held in place by means of a radial set-screw 76. Also shiftably mounted upon the shaft 65 outwardly of the sleeve 75, is an auxiliary sleeve 77 adjustably held in place by a radial set-screw 78 and provided with a diametrally reduced threaded hub 79 for accommodating an internally threaded adjustment sleeve 80 provided with a plurality of radial handles 81 and having endwise abutting engagement on its outer end face against the opposed or outer end face of the sleeve 75, all as best seen in Figure 6 and for purposes presently fully appearing.

Welded or otherwise suitably secured upon the upper face of the rails 2, 3, just forwardly of the forward auxiliary rail adjustment screws 18, is a pair of upstanding transversely aligned posts 82, and journaled at its ends in and extending horizontally between the posts 82 in horizontal alignment with the shafts 26, is a driven shaft 83 provided intermediate its ends with a diametrally enlarged roller 84. Shiftably mounted in the upper end of each of the posts 82, is a vertically shiftable journal block 85 adjustably held by means of a screw 86, and journaled at its ends in and extending horizontally between the blocks 85, is a shaft 87 provided intermediate its ends with an auxiliary roller 88 preferably of the same diametral size as the driven roller 84.

Bolted or otherwise suitably secured upon the upper faces of the rails 2, 3, forwardly of the posts 82, is a U-shaped bridge-plate 89 having upwardly and inwardly inclined legs 90 and a horizontal web section 91, the upper and horizontal face of which is disposed in a horizontal plane which extends substantially midway between the shafts 26, 26'. The forward transverse margin of the bridge-plate web 91 projects slightly over the gap 5 in the provision of a shearing edge s, and bolted or otherwise fixed upon the upper face of the bridge-plate web 91, is a fixed guide 92 formed of L-shaped angle section and having an upstanding or vertical flange 93. Shiftably mounted also upon the upper face of the bridge-plate web 91, is an adjustable guide 94 having an upstanding flange 95 and a pair of horizontal legs 96 provided with longitudinal slots 97 for slidably embracing upstanding threaded studs 98 fixed in the bridge-plate web 91, and, in turn, provided at their upper ends with wing nuts 99 for retentive or clamping engagement against the upper faces of the legs 96, all as best seen in Figure 11.

Welded or otherwise rigidly secured upon the outwardly presented faces of the rails 3, 4, on opposite sides of the gap 5, is a pair of aligned bearing brackets 100 for rotatively accommodating a shaft 101 projecting at its ends therethrough, and keyed or otherwise fixed upon the shaft 101 intermediate the journal brackets 100, is a hubbed disk 102 having a flat radial end face 103 aligned with the gap 5. Bolted or otherwise removably secured upon the end face 103, is an elongated knife bar 104 adapted to sweep through the gap and provided upon its one lateral face with a knife blade 105 for shearing co-operation with the shearing edge s of the bridge-plate web 91. At its outer or free end, the knife bar 104 passes between opposed upstanding steadying guides 106 respectively bolted or otherwise secured upon the bridge-plate web 91 and rail 2 on opposite sides of the gap 5, all as best seen in Figures 1 and 11.

Fixed upon the rails 2, 4, forwardly of the gap 5, is a pair of upstanding posts 107, and journaled at its ends in and extending between the posts 107, is an idler shaft 108 provided with a roller 109. Adjacent their upper ends, each of the posts 107 is further provided with a vertically shiftable journal block 110 held in any selected position of adjustment by means of a screw 111, and journaled in, and extending horizontally between the journal blocks 110, is an idler shaft 112 likewise provided with a pulley 113 vertically aligned with, and of substantially the same diametral size as, the pulley 109. Similarly fixed upon the rails 2, 4, adjacent the forward ends thereof, is a second pair of transversely aligned upstanding posts 114 likewise rotatably supporting a horizontal drive shaft 115 provided with a roller 116 horizontally aligned with, and of the same diametral size as, the pulley 109. The posts 114 are each likewise provided with vertically shiftable bearing blocks 117 held in any selected position of adjustment by the screws 118 for rotatably supporting an auxiliary drive shaft 119, which is, in turn, provided with a relatively narrow pulley 120 vertically aligned with and of the same diametral size as the roller 116. Trained around the rollers 109, 116, is a relatively wide endless conveyor belt 121, and similarly trained around the pulleys 113, 120, is a relatively narrow endless belt 122, the belts 121, 122, being adapted to substantially meet and engage on their upper and lower horizontal runs, respectively, all as best seen in Figures 1 and 12 and for purposes presently more fully appearing.

The forward legs 6 are extended upwardly above the rails 2, 4, and upon their forwardly presented faces are provided with upper and lower pairs of horizontally registering pillow blocks 123, 124, and journaled at their ends in and extending between the pairs of pillow blocks 123, 124, are vertically aligned horizontal shafts 125, 126. Keyed or otherwise fixed upon the shaft 125, is a pair of disks 127 having oppositely presented peripheral flanges 128 for supporting a plurality of horizontal bars 129 secured by clamp blocks 130 and co-operative clamp screws 131 and provided with outwardly presented arcuate faces 132. Similarly keyed or otherwise fixed upon the shaft 126, is a pair of disks 133 of the same diametral size as the disks 127 and likewise provided with oppositely presented peripheral flanges 134. Similarly clamped to the peripheral flanges 134 by means of clamp blocks 135 and clamp screws 136, are horizontal bars 137 each provided upon its outer face with a projecting crease-forming ridge 138 and each furthermore being positioned for matching registration with one of the bars 129. The bars 137 are furthermore provided upon their inner faces with conventional electric resistance heater elements 139, which are connected by means of wires 140 to a pair of concentric slip rings 141 mounted upon an annular dielectric ring 142 fixed upon the outwardly presented face of one of the disks 133. Mounted upon the inner face of one of the leg members 6, is a pair of conventional brushes 143 positioned for current-conducting engagement with the slip rings 141 and conventionally connected by means of a conduit 144 to any suitable source of electric current (not shown).

The forwardmost pair of shafts 26, 26', project laterally beyond the rail 3 and are provided on their projecting ends with meshing pinions 145, 145', and outwardly of the pinion 145 the shaft 26 is further provided with a large driving sprocket 146, which is connected by means of a sprocket chain 147 to the driving sprocket 148 of a conventional reduction gear assembly 149, which is, in turn, directly connected to an electric motor 150 suitably mounted upon a floor pedestal 151 beneath the frame 1 and conventionally connected to a source of electric current (not shown). The shafts 83, 87, also project laterally beyond the rail 3 and are provided with meshing pinions 152, 152'. Rotatively mounted upon a cross shaft 153 fixed in and projecting outwardly from the rail 3, is a drive gear 154 having meshing engagement both with the pinion 152 and the pinion 145. Outwardly of the pinion 152, the shaft 83 is provided with a small pinion 155 having meshing engagement with an idler gear 156 rotatably mounted on a stub shaft 157 fixed in and projecting outwardly from the rail 3. Likewise rotatably mounted on a third stub shaft 158 fixed in and projecting outwardly from the rail 3 is a compound pinion 159 having a spur gear portion 160 meshing with the idler gear 157 and a miter gear portion 161 having meshing engagement with a companion miter gear 162 pinned on the rearwardly projecting end of the knife blade shaft 101, all as best seen in Figures 1 and 4.

The shaft 153 also projects outwardly beyond the rail 2 and is provided on its projecting end with a miter gear 163 having meshing engagement with a companion miter gear 164 keyed or pinned upon the rearwardly projecting end of a longitudinally extending, horizontal jack shaft 165 suitably journaled in a bracket 166 fixed upon and projecting outwardly from the rail 2. At its forward end, the jack shaft 165 is pinned in a tubular sleeve 167, which is, in turn, provided at its forward end with a diametrally enlarged concentric disk 168.

Bolted or otherwise fixed upon and extending outwardly from the rail 2, is an auxiliary journal bracket 169 for rotatably supporting an auxiliary shaft 170 in axial alignment with the jack shaft 165 and provided at its rearward end with a face wheel 171 disposed in endwise abutting rotative engagement with the end face of the disk 168 and releasably secured thereto by means of a plurality of clamp blocks 172 bolted adjacent the periphery of, and extending rearwardly from, the face wheel 171 for clamping engagement with the peripheral area of the rear face of the disk 168. Keyed or otherwise suitably fixed upon the forward end of the auxiliary shaft 170, is a miter gear 173 having meshing engagement with a matching miter gear 174 pinned or otherwise suitably fixed upon the projecting end of the shaft 125. Also on its projecting end and inwardly of the miter gear 174, the shaft 125 is provided with a relatively large spur gear 175 having meshing engagement with an identical spur gear 176 fixed upon the projecting end of the shaft 126.

Mounted on and projecting laterally from the rail 2, is a short horizontal stub shaft 177 for rotatably supporting an idler gear 178 having meshing engagement with the spur gear 175 and also having meshing engagement with an identical gear 179 fixed upon the projecting end of the shaft 115 and, in turn, having meshing engagement with another identical gear 180 fixed upon the projecting end of the shaft 119, all as best seen in Figure 1.

In use, a roll R of sheeted transparent plastic material, such as cellulose acetate, "Cellophane", or similar material, is mounted on the supporting sleeves 74, 75, as shown in Figure 6, and the threaded sleeve 80 turned up, so that the roll R is held tightly on the shaft 65. The wing nut 73 is tightened sufficiently to place the desired amount of braking restraint upon the drum or wheel 66, so that the shaft 65 and the roll R will not unwind too freely. An end of the plastic sheet or strip r is unwound and fed over the roller 61. The bead-forming bars 37 are then adjusted or positioned along the supporting bars 35, so that the strip r when fed therethrough will marginally enter the grooves 41 through the slots 46. Furthermore, the auxiliary rails 17 are adjusted vertically by turning the screws 18, so that the opposed horizontal runs of the belts 34, 34', will be sufficiently close together to grip and feed the plastic strip r into and through the grooves 41 of the bead-forming bars 37, all as best seen in Figure 7.

Meanwhile the heater element 57 in the oil reservoir 55 has been energized and the oil therein brought up to the desired temperature. The hot oil has, furthermore, been pumped by means of the gear pump 52 through the bead-forming bars 37 for a sufficient length of time to bring the bars 37 up to the desired temperature.

Thus, when the motor 150 is energized, the sprocket 146 will be turned by the chain 147 and the pinion 145 will correspondingly drive the pinions 145' and the idler gear 154, which, in turn, drives the meshing pinions 152, 152'. Upon rotation of the pinions 145, 145', the shafts 26, 26', are correspondingly rotated, driving the belts 34, 34', and moving the plastic strip r through the channels 41 of the heated bead-forming bars 37. Due to the heat and the progressive contour of the channels 41, the marginal portions of the strip r soften and will begin to curl at the rearward or intake end of the bars 37, as shown in Figure 8, and will utimately be bent over in the formation of a complete bead at the forward or discharge end of the bars 37, as shown in Figure 9. It should be noted in this connection that the oil travels through the conduits 47 in a direction concurrent with the direction of movement of the strip r, so that the portion of the grooves 41 at which the peripheral margins of the strip r initially begin to curl will be at the highest temperature. It is, accordingly, possible where necessary to obtain a temperature gradient along the grooves 41 such that the completely formed bead, as it nears the discharge end of the grooves 41, will begin to cool and take on a permanent set, thereby insuring against collapse or undesired distortion of the bead as the strip moves forwardly away from the bead-forming bars 37.

As it passes beyond the forward extremity of the horizontal run of the belts 34, 34', the beaded strip r passes between the rolls 84, 88, as seen in Figure 10, and is propelled across the bridge plate web 91 between the guide flanges 93, 95, and across the shearing edge s thereof, whereupon it is caught between the belts 121, 122, and conveyed forwardly. Upon rotation of the shaft 83, the pinion 155 drives the idler gear 156, which, in turn, drives the pinion 160 and its associated bevel gear section 161 and the matching bevel gear 162 for rotating the knife blade shaft 101 and intermittently causing the knife blade 105 to sweep downwardly across and shear off the beaded strip. It will, of course, be evident that the length of the strip which is cut off will depend upon the ratio of the several gears in the above described gear train and, by changing this gear ratio, the length of beaded strip may be varied to meet any given requirement.

By reason of the fact that the lineal feed of the strip r is continuous and the cutting action of the knife blade 105 is of essentially intermittent character, the strip r will be held momentarily stationary as the cut is made and the uncut portion of the beaded strip will tend to bow up slightly in back of the knife during this momentary stoppage to compensate for the continuous lineal movement. For this reason, and also in order to permit the bead to cool sufficiently to become rigid, the bridge-plate 89 should be fairly wide lengthwise of the machine. In this same connection, it should be pointed out that the guide flanges 93, 95, should be high enough to hold the beaded strip r against sidewise bending or buckling and force the bead to bow or bend in a substantially vertical or upward direction during the cutting interval to insure a smooth and accurately sheared transverse margin in the cut or severed strip sections. It will also be evident that the strip r cannot be fed into the machine at the beginning of operations with any very great accuracy in reference to the timing of the knife blade 105. Hence the initial strip which is cut off or severed will in all probability be of inaccurate length and should be discarded. All other succeeding strip sections, however, will be severed accurately at the desired length.

As the severed cut-off beaded strips are fed forwardly between the belts 121, 122, they pass between the shafts 125, 126, and are intermittently pinched, as shown in Figure 15, between the successive pairs of bars 129, 137, in the formation of a side wall strip B provided along its longitudinal margins with integral beads b having spaced pairs of transversely aligned creases or indentations d, as shown in Figure 16. The strip B, although formed of material which is initially flexible and relatively non-rigid, will in finished form be substantially rigid and, at the same time, be foldable along lines extending between the pairs of indentations d to form an upstanding container side wall.

The bars 129, 137, are heated by the electric heater elements 139, so that the crease or deformation d will be formed permanently and without crushing, tearing, or otherwise destroying the bead b on either side of such deformations d. In this connection, it will be obvious that the speed of rotation of the bar-carrying shafts 125, 126, and the associated bar-carrying disks 127, 133, will be dependent upon the ratio of the miter gear 163 to the several gears of the main driving gear train, above described.

As shown, the machine A is designed to make four equally spaced indentations in the bead b of each cut-off length of beaded strip, so that the finished strip B, when discharged into a suitable hopper (not shown), will be adapted for bending and endwise lapping in the formation of a four-sided container-forming tube, as more fully illustrated and discussed in my co-pending application, Serial No. 367,003, filed contemporaneously herewith. It will, of course, be immediately apparent that, by changing the relative position of the bars 129, 137, the creases or deformations d may be placed at differently spaced intervals for forming a container side wall strip adapted to be fabricated into an oblong, rather than square, container, and similarly, by increasing or decreasing the number of matching pairs of bars 129, 137, it is possible to provide a container side wall forming strip adapted to form a polygonal container of any desired number of sides. Finally, by disconnecting the jack shaft 165 and the auxiliary shaft 170 and manually rotating the shafts 125, 126, so that none of the pairs of bars 129, 137, are in position to engage the cut-off strips, it is possible to provide an entirely uncreased or undented strip which may be employed to form a circular container side wall.

It will also be evident that, by changing the axial spacing between the pairs of pulleys 27, 27', 31, and 31', and also by changing the transverse distance between the bead-forming bars 37, all as above described, and accordingly employing a roll of stock of appropriate width, it will be possible to fabricate container side wall forming strips of any desired width for forming container side walls of a corresponding height. Similarly, by removing the several intermeshing gears and pinions which form the driving mechanism and substituting gears and pinions of different ratio, it is possible to provide container side wall forming strips of different lengths, which, in turn, may be formed into containers of correspondingly different peripheral size.

It should be understood that changes and modifications in the form, construction, arrangement, and combination of the several parts of the container-making machine may be made and substituted for those herein shown and described without departing from the nature and principle of our invention.

Having thus described our invention, what we claim and desire to secure by Letters Patent is:

1. A container-making machine comprising means for feeding a strip of transparent container-forming material along a predetermined path, means adjacent said path for engaging a longitudinal margin of the strip and forming a bead therealong, and heated means for forming transverse indentations in the bead.

2. A container-making machine comprising means for feeding a strip of transparent container-forming material forwardly along a predetermined path, means adjacent said path for engaging a longitudinal margin of the strip and forming a bead therealong, and heated means spaced forwardly of the bead-forming means for creasing the bead to produce a narrowly restricted area of deformation while leaving the bead substantially unchanged in cross-sectional contour immediately adjacent to and on either side of the area of deformation.

3. A container-making machine comprising means for feeding a strip of transparent container-forming material along a predetermined path, means adjacent said path for engaging and shaping the longitudinal margins of the strip into spaced parallel beads imparting longitudinal rigidity to the strip, and means for forming transversely aligned pairs of indentations in the bead to produce a narrowly restricted area of deformation while leaving the bead substantially unchanged in cross-sectional contour immediately adjacent to and on either side of the area of deformation.

4. A container-making machine comprising means for feeding a strip of transparent container-forming material along a predetermined path, means adjacent said path for engaging and shaping the longitudinal margins of the strip into spaced parallel beads imparting longitudinal rigidity to the strip, and heated means operable in timed relation to the feeding means for forming pairs of transversely aligned indentations in the beads at spaced intervals longitudinally of the strip.

5. A container-making machine comprising means for feeding a strip of transparent container-forming material forwardly along a predetermined path, means adjacent said path for engaging a longitudinal margin of the strip and forming a bead therealong, means positioned forwardly of the bead-forming means for cutting the beaded strip into sections, and heated means positioned forwardly of the cutting means for forming indentations in the bead of the severed sections.

6. A container-making machine comprising means for feeding a strip of transparent container-forming material along a predetermined path, means adjacent said path for engaging and shaping the longitudinal margins of the strip into spaced parallel beads imparting longitudinal rigidity to the strip, means for transversely severing the beaded strip in the formation of sections of predetermined length, and heated means for forming longitudinally spaced pairs of transversely aligned indentations in the beads of the severed sections.

7. A container-making machine comprising means for feeding a strip of transparent container-forming material along a predetermined path, means adjacent said path for engaging a longitudinal margin of the strip and forming a bead therealong, and a plurality of pairs of heated bars for momentarily engaging and moving with the strip for forming transverse indentations in the bead.

8. A container-making machine comprising means for feeding a strip of transparent container-forming material along a predetermined path, means adjacent said path for engaging a longitudinal margin of the strip and forming a bead therealong, and a plurality of pairs of bars for momentarily engaging and moving with the strip, one bar of each pair being provided with electric heating elements, slip ring means associated with the bars, and brushes engageable with the slip rings for supplying electrical current to the heating elements for heating the bars and thereby permanently forming transverse indentations in the bead.

9. A container-making machine comprising feeding means for progressing a flexible strip of container-forming material forwardly along a predetermined path while engaging said material along both its upper and lower faces to prevent any buckling of the material, means adjacent said path for engaging a longitudinal margin of the strip and forming a bead thereon, cut-off means adapted for severing the strip along a straight line at right angles to its path of movement, said cut-off means being positioned in forwardly spaced relationship to the feeding means, guide means interposed between the feeding means and the cut-off means for engaging the lengthwise margins of the strip, said strip otherwise being unconfined on at least one of its flat faces so that the strip may flex along that portion of its length extending between the feeding means and the cut-off means, whereby the forward travel of that portion of the strip adjacent to the cut-off means will be momentarily arrested during the strip severing operation while permitting the feeding means to remain in continuous operation.

ALVIN A. ABRAMSON.
CARLETON MANTHEY.